April 19, 1966   P. L. KOEHMSTEDT ETAL   3,246,505
LEAK DETECTION METHOD AND APPARATUS
Filed Sept. 9, 1963

INVENTORS.
PAUL L. KOEHMSTEDT
WEIGHTSTILL W. WOODS
BY
L. E. Carnahan
AGENT

3,246,505
LEAK DETECTION METHOD AND APPARATUS

Paul L. Koehmstedt, Kent, and Weightstill W. Woods, Redmond, Wash., assignors to The Boeing Company, Seattle, Wash., a corporation of Delaware
Filed Sept. 9, 1963, Ser. No. 307,553
7 Claims. (Cl. 73—40.7)

This invention relates to the detection of leaks in vessels, pipes, and other closed systems, and more particularly to a method and apparatus for forcing a tracer gas through small openings into a sealed object, so that subsequent detection of the tracer will, upon calibration, enable determination of the leak rate of the object being tested.

Previous attempts have taken two paths: (1) pressurization with inexpensive, non-toxic gases such as helium, which can be conveniently detected only by leaking out or by destruction of the object case; and (2) pressurization with radioactive gases, which may be detected by indication of decay radiation passing through object walls. Such pressurization schemes have all involved external evacuation subsequent to pressurization in order that the expensive, toxic radioactive pressurizing gas be recovered. This resulted, with objects having moderate leak rates, in evacuation of the object being tested, so that little or no tracer gas would remain inside the object, and the leak if detected would be indicated as a small one.

This invention basically relates to the use of a two phase (liquid/gas) carrier for pressurization and for "pumping" the tracer gas from one chamber to another. This allows recovery of essentially all of the tracer gas external to the test object without danger of complete removal of the tracer gas from the test object.

Therefore, it is an object of this invention to provide a leak detection method and apparatus.

A further object of the invention is to provide a method and apparatus for forcing a tracer gas through small openings into a sealed object, so that subsequent detection of the tracer will enable determination of the leak rate of the object being tested.

Another object of the invention is to provide a leak detection method and apparatus which utilizes a two phase (liquid/gas) carrier.

Another object of the invention is to provide a leak detection method and apparatus which utilizes a two phase carrier and wherein the sequence of air removal, pressurization and tracer gas recovery are automatic.

Other objects of the invention not specifically set forth above will become readily apparent from the accompanying description and drawings in which.

Figure 1:
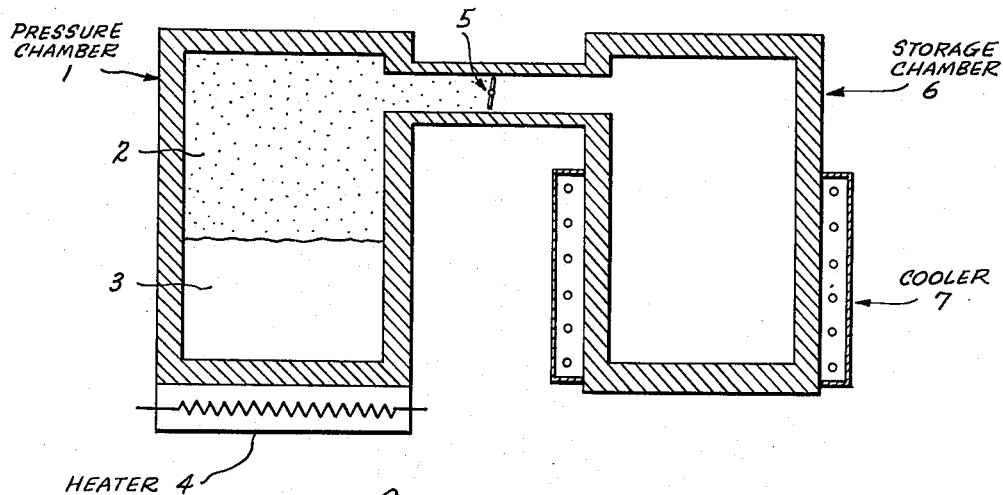
FIG. 1 is a schematic view of an embodiment for carrying out the invention.

As shown in FIG. 1, a tracer gas at a partial pressure of 0.1 atmosphere or less is contained in a pressure chamber 1 in a mixture 2 with the carrier gas phase, the carrier in this embodiment being Freon 11. The pressure is increased, if desired, by raising the temperature of the pressure chamber 1 and carrier liquid phase 3 by means of an electric heater 4. The tracer gas is transferred to storage chamber 6 by opening transfer valve 5, supplying refrigerant to cooling jacket 7 and boiling the liquid carrier phase 3 in pressure chamber 1 with heater 4. Calculations show that if turbulent mixing obtains in pressure chamber 1, and an amount of 10% liquid Freon 11 carrier by volume is transferred to the storage chamber 6 by evaporation and recondensation, the concentration of tracer gas in the pressure chamber 1 will be reduced by a factor of 70,000,000,000.

Figure 2:
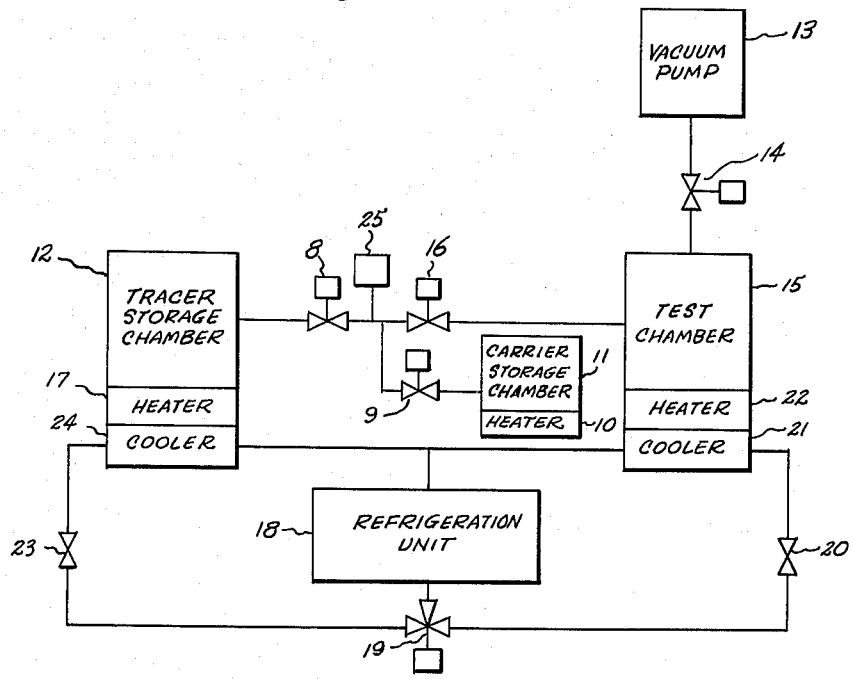
FIG. 2 is a schematic view of an embodiment of the invention utilizing automatic control mechanism.

FIG. 2 shows a system for making the sequence of air removal, pressurization, and tracer gas recovery an automatic process, requiring no monitoring or manual operation between start and completion of the sequence. A stepping switch (not shown) operates to provide the following sequence:

(A) Solenoid valves 8 and 9 and heater 10 operate to transfer carrier liquid from a carrier storage chamber 11 to a tracer storage chamber 12 until a carrier liquid gage (not shown) in tracer storage chamber 12 indicates proper level.

(B) Solenoid valves 8 and 9 and heater 10 are de-energized. Solenoid valve 14 and a vacuum pump 13 are energized to remove air from a test chamber 15. A cold-cathode electrical discharge vacuum gage (not shown) is energized to measure pressure in test chamber 15, and the first indication is at approximately 10 mm. Hg. pressure.

(C) The functions of (B) above are continued except that the vacuum gage output decreases with pressure to a value corresponding to 50 microns of mercury.

(D) Solenoid valve 14, vacuum pump 13, and the vacuum gage (not shown) are de-energized and a timer (not shown) operates for ten seconds.

(E) Solenoid valves 8 and 16, a heater 17, a refrigeration unit 18, and a 3-way solenoid valve 19 are energized so that tracer storage chamber 12 is heated by heater 17 and test chamber 15 is cooled by passage of refrigerant through an expansion valve 20 and a cooler 21. Tracer gas is transferred by pumping until a carrier liquid level gage (not shown) indicates transfer of sufficient carrier gas.

(F) Solenoid valves 8, 16 and 19, heater 17, and refrigeration unit 18 are de-energized. A heater 22 is energized through a thermostat (not shown) to stabilize at 140° F., at which temperature the carrier (Freon 11) has a vapor pressure of three atmospheres. A pre-set timer (not shown) is energized to set the duration of pressurization.

(G) At completion of pressurization, solenoid valves 8 and 16, heater 22, and refrigeration unit 18 are energized to recover tracer gas from test chamber 15 by heating the test chamber by heater 22 and cooling tracer storage chamber 12 by passage of refrigerant through an expansion valve 23 and a cooler 24. Pressure switch 25 indicates completion of transfer.

(H) Solenoid valves 8 and 16, heater 22, and refrigeration unit 18 are de-energized, thus ending the cycle.

During the cycle described above, various safety devices such as lid closure interlock switches, safety thermostats, and timers may be employed as required. However, such devices have not been shown for clarity since the same are well known elements.

The tracer gas, for example, may be Krypton[85], Tritium, Iron[55] carbonyl, or any other suitable gas. The timing, pressures, and temperatures utilized in the system described above differs with the different type of tracer gas used therein.

It has thus been shown that this invention provides an effective and accurate method and apparatus for detecting leaks in vessels, pipes, and other closed systems, thus overcoming the disadvantages of the prior known devices.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What we claim is:
1. A method of detecting leaks in a closed assembly comprising the steps of containing a carrier fluid having liquid and gaseous phases, mixing a tracer gas with the gaseous phase of the carrier fluid, heating the liquid phase of the carrier fluid to increase the pressure of the mixture, transferring the tracer gas by boiling the liquid phase of the carrier fluid and cooling the tracer gas, and determining the amount of tracer gas remaining in the mixture.

2. A method of detecting leaks in a closed assembly comprising the steps of containing a carrier fluid having liquid and gaseous phases, mixing a tracer gas with the gaseous phase of the carrier fluid at a partial pressure of not more than 0.1 atmosphere, increasing the pressure to a desired value by heating the liquid phase of the carrier fluid, transferring the tracer gas for storage by boiling the liquid phase of the carrier fluid and cooling the tracer gas, and determining the amount of tracer gas remaining in the mixture.

3. An automatic system for detecting leaks including a carrier gas storage chamber, a tracer gas storage chamber, a test chamber, means for heating said chambers, means for cooling said tracer gas storage chamber and said test chamber, means for reducing the pressure in said test chamber, means for controlling said heating and cooling means, and means for controlling passage of gas between said chambers.

4. The system defined in claim 3 wherein said cooling means includes a refrigeration unit and at least one expansion valve.

5. The system defined in claim 4 wherein said cooling means additionally includes a three-way solenoid valve.

6. The system defined in claim 3 wherein said means for reducing pressure in said test chamber includes a vacuum pump and a solenoid valve.

7. The system defined in claim 3 wherein said last mentioned means includes a plurality of solenoid valves.

References Cited by the Examiner
UNITED STATES PATENTS

| | | |
|---|---|---|
| 2,096,099 | 10/1937 | Gaugler. |
| 2,931,190 | 4/1960 | Dubitzky _____ 62—502 X |
| 2,938,362 | 5/1960 | Schwind _____ 62—502 X |

LOUIS R. PRINCE, *Primary Examiner.*

DAVID SCHONBERG, *Examiner.*

JAMES RENJILIAN, *Assistant Examiner.*